United States Patent
Yoo

(10) Patent No.: US 8,677,490 B2
(45) Date of Patent: Mar. 18, 2014

(54) METHOD FOR INFERRING MALICIOUSNESS OF EMAIL AND DETECTING A VIRUS PATTERN

(75) Inventor: In Seon Yoo, Gyeonggi-Do (KR)

(73) Assignee: Samsung SDS Co., Ltd., Seoul (KR)

( * ) Notice: Subject to any disclaimer, the term of this patent is extended or adjusted under 35 U.S.C. 154(b) by 928 days.

(21) Appl. No.: 11/913,280

(22) PCT Filed: Dec. 8, 2006

(86) PCT No.: PCT/KR2006/005340
§ 371 (c)(1),
(2), (4) Date: Oct. 31, 2007

(87) PCT Pub. No.: WO2008/060010
PCT Pub. Date: May 22, 2008

(65) Prior Publication Data
US 2010/0077480 A1    Mar. 25, 2010

(30) Foreign Application Priority Data

Nov. 13, 2006  (KR) .......................... 10-2006-0111617

(51) Int. Cl.
*G06F 11/00* (2006.01)
*G06F 15/16* (2006.01)
*G06F 11/30* (2006.01)

(52) U.S. Cl.
USPC .............................. 726/24; 709/206; 713/188

(58) Field of Classification Search
USPC .............................. 726/24; 713/188; 709/206
See application file for complete search history.

(56) References Cited

U.S. PATENT DOCUMENTS 6,832,244 B1 * 12/2004 Raghunandan ............... 709/206
6,993,660 B1 *  1/2006 Libenzi et al. ................ 713/188

(Continued)

FOREIGN PATENT DOCUMENTS

JP       10-207796 A      8/1998
JP     2003-218945 A      7/2003

(Continued)

OTHER PUBLICATIONS

Kohonen et al. "Very Large Two-Level SOM for the Browsing of Newsgroups", Lecture Notes in Computer Science, 1996, pp. 269-274, vol. 1112, Springer, Berlin.

(Continued)

*Primary Examiner* — Techane Gergiso
(74) *Attorney, Agent, or Firm* — Sughrue Mion, PLLC

(57) ABSTRACT

Provided is a method of distinguishing an abnormal e-mail and determining whether an e-mail is affected with a virus. The method includes the steps of: decoding a received e-mail packet in a readable format and then analyzing and classifying a header of the packet according to header information; determining whether each classified piece of header information is normal or abnormal, and giving a specific value to the corresponding header information according to the determination result; distinguishing an abnormal e-mail using the specific values given to the respective pieces of header information according to a logical inference rule; and when there is an executable attachment file among the header information of the e-mail distinguished as abnormal, determining whether the abnormal e-mail is infected with a virus using distribution of similarity among data. The method effectively distinguishes an abnormal e-mail and determines whether an e-mail is infected with a virus without a database for spam filtering or a database of virus information, and thus is capable of stopping the propagation of new viruses. Therefore, an e-mail server can have a security technique and handle abnormal e-mail in a step before operation of a spam filter server or an antivirus server. Consequently, it is possible to manage a mail server more securely.

20 Claims, 8 Drawing Sheets

(56) References Cited

U.S. PATENT DOCUMENTS

| | | | |
|---|---|---|---|
| 7,117,533 B1 * | 10/2006 | Libenzi | 726/24 |
| 7,293,171 B2 * | 11/2007 | Batthish et al. | 713/152 |
| 7,685,639 B1 * | 3/2010 | McCorkendale et al. | 726/24 |
| 7,958,557 B2 * | 6/2011 | Kwan | 726/23 |
| 2002/0091776 A1 * | 7/2002 | Nolan et al. | 709/206 |
| 2002/0147780 A1 * | 10/2002 | Liu et al. | 709/206 |
| 2002/0199120 A1 * | 12/2002 | Schmidt | 713/201 |
| 2003/0084110 A1 * | 5/2003 | Shono | 709/206 |
| 2003/0088705 A1 * | 5/2003 | Katagishi et al. | 709/246 |
| 2003/0204569 A1 * | 10/2003 | Andrews et al. | 709/206 |
| 2004/0054498 A1 * | 3/2004 | Shipp | 702/182 |
| 2004/0064515 A1 * | 4/2004 | Hockey | 709/206 |
| 2004/0073617 A1 * | 4/2004 | Milliken et al. | 709/206 |
| 2004/0128355 A1 * | 7/2004 | Chao et al. | 709/206 |
| 2004/0199594 A1 * | 10/2004 | Radatti et al. | 709/206 |
| 2005/0065906 A1 * | 3/2005 | Romero | 707/1 |
| 2005/0160292 A1 * | 7/2005 | Batthish et al. | 713/201 |
| 2005/0216770 A1 * | 9/2005 | Rowett et al. | 713/201 |
| 2006/0031359 A1 * | 2/2006 | Clegg et al. | 709/206 |
| 2006/0168066 A1 * | 7/2006 | Helsper et al. | 709/206 |
| 2006/0184632 A1 * | 8/2006 | Marino et al. | 709/206 |
| 2007/0043819 A1 * | 2/2007 | Katagishi et al. | 709/206 |
| 2007/0121596 A1 * | 5/2007 | Kurapati et al. | 370/356 |
| 2007/0157307 A1 * | 7/2007 | Katoh et al. | 726/14 |
| 2007/0271611 A1 * | 11/2007 | Kwan | 726/22 |
| 2009/0131090 A1 * | 5/2009 | Jo et al. | 455/466 |

FOREIGN PATENT DOCUMENTS

| | | |
|---|---|---|
| KR | 1020020063534 A | 8/2002 |
| KR | 2003-0055817 A | 7/2003 |
| KR | 1020030092974 A | 12/2003 |

OTHER PUBLICATIONS

Kohonen "Exploration of Very Large Databases by Self-Organizing Maps", Proceedings of the IEEE International Conference on Neural Networks, 1997, pp. 1-6.

Kohonen "Self-Organization of Very Large Document Collections: State of the Art", Proceedings of ICANN98, the 8th International Conference on Artificial Neural Networks, 1998, pp. 65-74, vol. 1, Springer, London.

Kohonen et al. "Self Organization of a Massive Document Collection", IEEE Transaction on Neural Networks, May 2000, pp. 1-33, vol. 11, No. 3.

* cited by examiner

Fig. 5

| 23117 | 144 | 3 | 0 | 4 | 0 | -1 | 0 |
|---|---|---|---|---|---|---|---|
| 184 | 0 | 0 | 0 | 64 | 0 | 0 | 0 |
| 0 | 0 | 0 | 0 | 0 | 0 | 0 | 0 |
| 0 | 0 | 0 | 0 | 0 | 0 | 128 | 0 |
| 7950 | 3770 | -19456 | -13047 | -18399 | 19457 | 8653 | 26708 |
| 29545 | 28704 | 28530 | 29287 | 28001 | 25376 | 28257 | 28526 |
| 8308 | 25954 | 29216 | 28277 | 26912 | 8302 | 20292 | 8275 |
| 28525 | 25956 | 3374 | 2573 | 36 | 0 | 0 | -32000 |
| 17744 | 0 | 332 | 4 | -5833 | 12203 | 0 | 0 |
| 160 | 0 | 224 | 774 | 267 | 15362 | 11264 | 0 |
| 6656 | 0 | 0 | 0 | 576 | 0 | 4096 | 0 |
| 16384 | 0 | 0 | 258 | 4096 | 0 | 512 | 0 |
| 3 | 51 | 3 | 51 | 3 | 51 | 0 | 0 |
| 28672 | 0 | 1024 | 0 | 18759 | 1 | 3 | 0 |
| 0 | 16 | 4096 | 0 | 0 | 16 | 4096 | 0 |
| 0 | 0 | 16 | 0 | 0 | 0 | 0 | 0 |

Fig. 6

| 24129.1 | 20340.3 | 23190.7 | 23629.8 | 19367.9 | 22311.2 | 24148.3 | 21672.6 |
|---|---|---|---|---|---|---|---|
| 20839.7 | 18164.1 | 20361.4 | 21115.9 | 18384.5 | 20839.1 | 22101.3 | 21562.7 |
| 14411.5 | 14993 | 15461.2 | 17736.2 | 15260 | 18068.9 | 18641.3 | 21571.5 |
| 8414.91 | 12355.2 | 9814.07 | 14620.4 | 8480.12 | 15002.7 | 15553.4 | 21546.2 |
| 5112.1 | 10431 | 4608.57 | 11809.6 | -2023.34 | 11661.8 | 12270.4 | 19973.7 |
| 1835.45 | 8076.93 | 1628.31 | 10021.4 | -12590.1 | 7613.82 | 8548.16 | 16714.6 |
| -4539.96 | 4589.11 | 1298.18 | 9070.96 | -17351.6 | 2203.61 | 5679.94 | 12179 |
| -12995.1 | 2443.94 | 2216 | 7922.7 | -13139.8 | -3445.28 | 3428.78 | 7232.55 |
| -19637.9 | 2842.83 | 3665.27 | 5769.45 | -4784.97 | -7437.34 | 2507.05 | 2127.02 |
| -21910.2 | 4044.92 | 5548.93 | 1265.92 | 556.37 | -7842.5 | 4815.65 | -6501.24 |
| -19057.4 | 4881.61 | 7861.67 | -5890.4 | 274.195 | -3706.02 | 9464.26 | -17828.2 |
| -14481 | 5011.44 | 9353.45 | -11965.7 | -2300.22 | 927.089 | 12008.6 | -25129.4 |
| 21361 | 18492.9 | 21166.5 | 21707.7 | 18189.3 | 18790.5 | 19788.8 | 18948.8 |
| 16432.7 | 15361.1 | 16944.5 | 17707.8 | 16410.5 | 17058.7 | 17354.7 | 18332.5 |
| 11016.5 | 12837.7 | 12253.4 | 14075.3 | 13243.8 | 15297.3 | 16099.9 | 18390.3 |
| 6572.49 | 10947.2 | 6324.81 | 10247.4 | 6481.77 | 12974.4 | 15454.7 | 18341.3 |
| 3721.84 | 9191.87 | 1131.42 | 7380.22 | -3054.48 | 9854.04 | 12859.9 | 16425.8 |

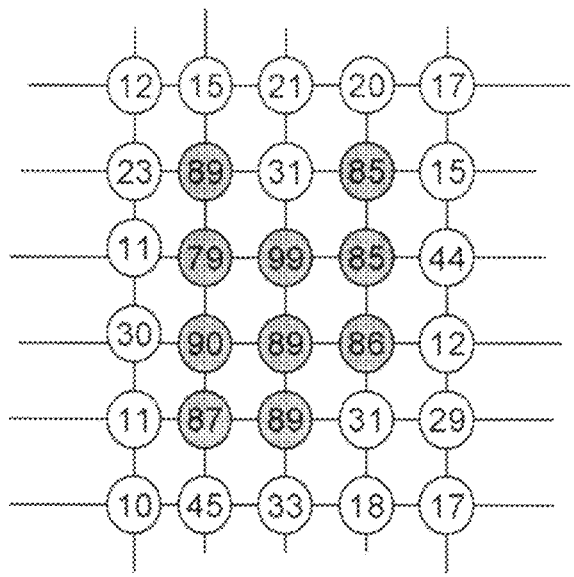
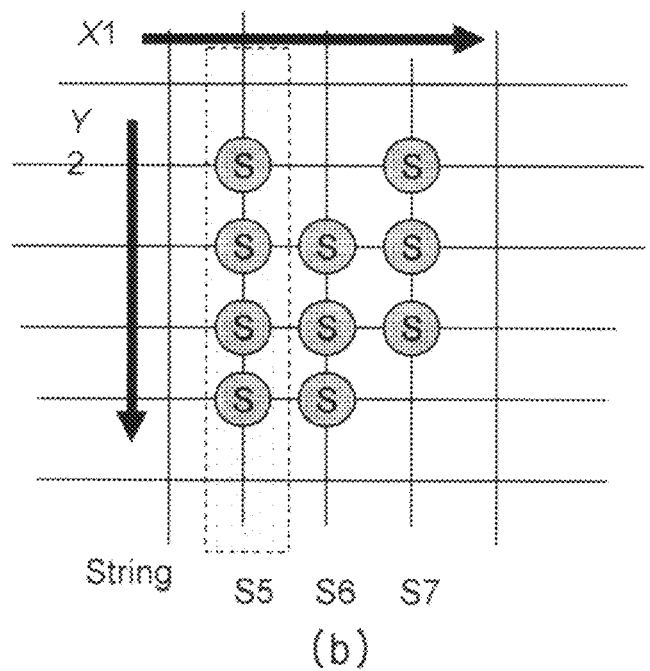
Fig. 10

METHOD FOR INFERRING MALICIOUSNESS OF EMAIL AND DETECTING A VIRUS PATTERN

TECHNICAL FIELD

The present invention relates to a method of distinguishing an abnormal e-mail and determining whether an e-mail is infected with a virus, and more particularly, to a method of distinguishing an abnormal e-mail and effectively determining whether an abnormal e-mail having an executable attachment file is infected with a virus on the basis of e-mail packet probability data according to a logical inference rule, without a database for spam filtering or a database of virus information.

BACKGROUND ART

With the convenient use of e-mail, the rapid spread of the Internet, and the development of Internet technology, cyber attacks via e-mail are increasing.

For example, a variety of spam is sent through e-mail, e-mail spams are on the rise, and virus propagation using e-mail is also a growing problem.

To counter these threats, spam filtering and antivirus techniques have been devised, but conventional countermeasures only detect dangerous e-mail and prevent it from causing harm on the basis of information on already-known patterns.

More specifically, when a user puts an attachment file having a specific format, i.e., extension, or a specific e-mail address, in a block list, an e-mail having an attachment file of the set format or an e-mail sent from the set e-mail address is classified as spam thereafter.

In addition, in conventional spam processing using pattern matching, respective patterns of generated spam mail are stored in a database, and when a spam mail has a matching pattern, it is blocked.

In the same way, virus signatures are stored in a database, an antivirus program checks files, and when a virus signature is detected, the file is determined to be infected with a virus. In the same way, when the signature of an Internet worm is detected, the file is determined to be infected and processed.

However, the conventional techniques are only effective if the database of known spam or virus signatures is up to date. And, they are incapable of handling new, unknown spam and viruses. Thus, the conventional techniques are no defense against a zero-day attack.

DISCLOSURE

Technical Problem

The present invention is directed to a method of distinguishing an abnormal e-mail by which an e-mail server employs a security technique to effectively distinguish an abnormal e-mail using a logical inference rule, and processes the abnormal e-mail, in a step before a spam filtering process is performed by a spam filter server using conventional patterns, the method thus enhancing the security of e-mail service.

The present invention is also directed to a method of determining whether a received e-mail is infected with a virus using distribution of similarity among data, without a database of virus information, when an executable file is attached to the e-mail, the method thus providing effective protection against new viruses.

Technical Solution

One aspect of the present invention provides a method of distinguishing an abnormal e-mail, comprising the steps of: decoding a received e-mail packet in a readable format and then analyzing and classifying a header of the packet according to header information; determining whether each classified piece of header information is normal or abnormal, and giving a specific value to the corresponding header information according to the determination result; and distinguishing an abnormal e-mail using the specific values given to the respective pieces of header information according to a logical inference rule.

Here, the header information may comprise a mail header H, an originator section Fr, a recipient section To, and information of an executable attachment file EF.

When header information is normal, a specific value of 1 may be given to the header information, and when header information is abnormal, a specific value of 0 may be given to the header information.

When information of the originator section Fr is normal, information of the recipient section To and information of the mail header H are abnormal, and there is an executable attachment file EF, the logical inference rule may classify the e-mail to which the packet belongs as abnormal.

When information of the originator section Fr is abnormal, information of the recipient section To is normal, information of the mail header H is abnormal, and there is an executable attachment file EF, the logical inference rule may classify the e-mail to which the packet belongs as abnormal.

When information of the originator section Fr and information of the recipient section To are abnormal, information of the mail header H is normal, and there is an executable attachment file EF, the logical inference rule may classify the e-mail to which the packet belongs as abnormal.

When information of the originator section Fr, information of the recipient section To and information of the mail header H are abnormal, the logical inference rule may classify the e-mail to which the packet belongs as abnormal.

Another aspect of the present invention provides a method of determining whether an e-mail is infected with a virus, comprising the steps of: decoding a received e-mail packet in a readable format and then analyzing and classifying a header of the packet according to header information; determining whether each classified piece of header information is normal or abnormal, and giving a specific value to the corresponding header information according to the determination result; distinguishing an abnormal e-mail using the specific values given to respective pieces of header information according to a logical inference rule; and when there is an executable attachment file among the header information of an e-mail distinguished as abnormal, determining whether the abnormal e-mail is infected with a virus using distribution of similarity among data.

Here, the step of determining whether the abnormal e-mail is infected with a virus may comprise the steps of: converting and simplifying data of the executable attachment file; normalizing the simplified data of the executable attachment file; obtaining distribution of similarity among data using the normalized data of the executable attachment file; and analyzing the obtained distribution of similarity among data, and when a previously set dense distribution pattern exists, determining that the executable attachment file is infected with a virus.

The distribution of similarity among data may be obtained by generating an optimized codemap of the normalized data of the executable attachment file and then constructing a new matrix on the basis of average values of surrounding values.

Still another aspect of the present invention provides a method of determining whether an e-mail is infected with a virus, the method comprising the steps of: normalizing simplified data of an executable attachment file; obtaining distribution of similarity among data using the normalized data of the executable attachment file; and analyzing the obtained distribution of similarity among data, and when a previously set dense distribution pattern exists, determining that the executable attachment file is infected with a virus.

Yet another aspect of the present invention provides a recording medium storing a program for executing the above-described method of distinguishing an abnormal e-mail and determining whether an e-mail is infected with a virus.

Advantageous Effects

According to the inventive methods of distinguishing an abnormal e-mail and determining whether an e-mail is infected with a virus, an abnormal e-mail is effectively distinguished without a database for spam filtering or a database of virus information, it is determined whether an e-mail is infected with a virus, and thus it is possible to effectively prevent propagation of new viruses.

In addition, according to the present invention, an e-mail server can have a security technique and handle an abnormal e-mail in a step before operation of a spam filter server or an antivirus server, and thus it is possible to manage a mail server more securely.

DESCRIPTION OF DRAWINGS

FIGS. 5 to 9 are diagrams showing actual data of files determined to be infected with a virus by a method of determining whether an e-mail is infected with a virus according to an exemplary embodiment of the present invention; and FIG. 10 is a diagram showing actual data having a dense distribution pattern applied to an exemplary embodiment of the present invention.

MODE FOR INVENTION

Hereinafter, exemplary embodiments of the present invention will be described in detail. However, the present invention is not limited to the embodiments disclosed below, but can be implemented in various forms. The following embodiments are described in order to enable those of ordinary skill in the art to practice the invention.

Figure 1:
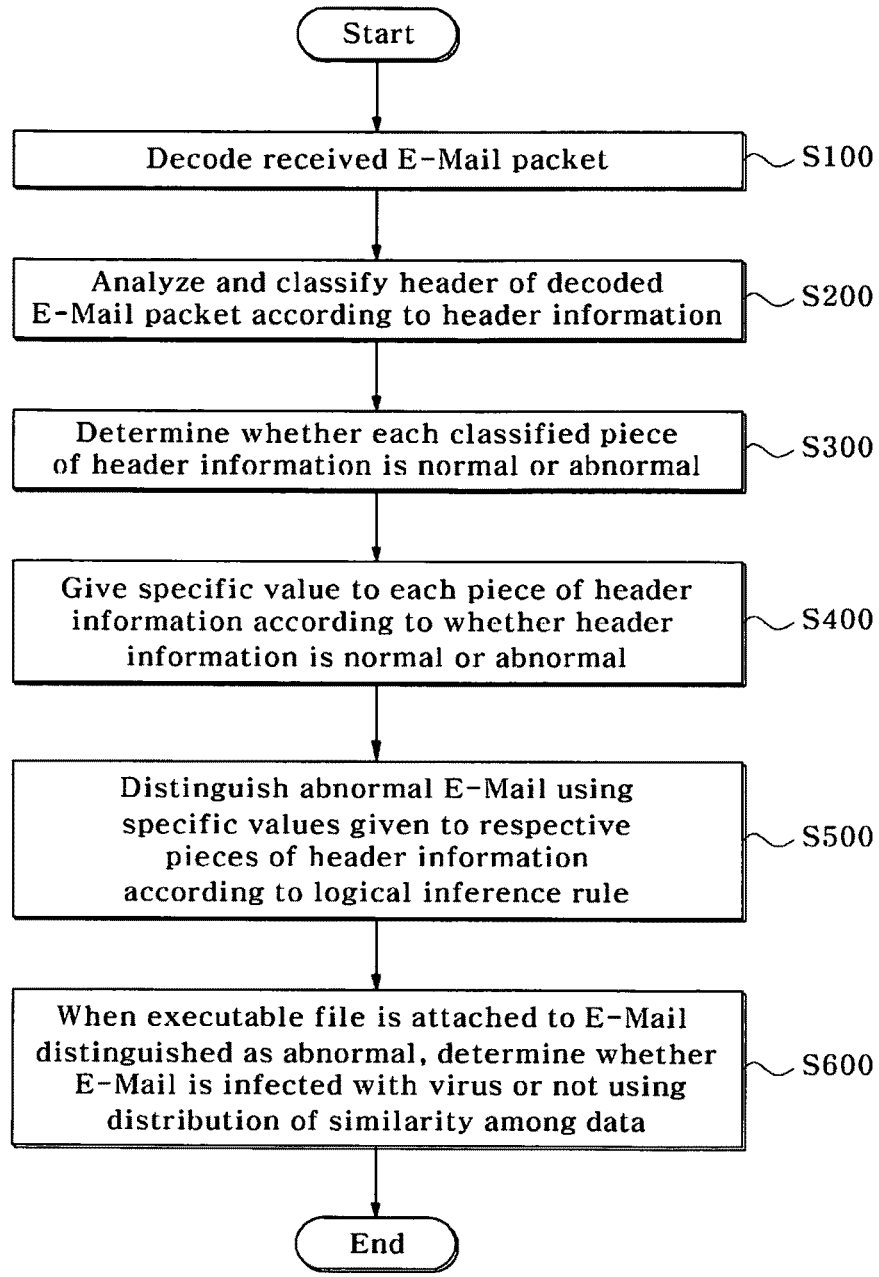
FIG. 1 is a flowchart illustrating a method of distinguishing an abnormal e-mail and determining whether the abnormal e-mail is infected with a virus according to an exemplary embodiment of the present invention.

FIG. 1 is a flowchart illustrating a method of distinguishing an abnormal e-mail and determining whether the abnormal e-mail is infected with a virus according to an exemplary embodiment of the present invention.

Referring to FIG. 1, when an e-mail packet is received, the received e-mail packet is decoded in a readable format (step 100), and then the header of the e-mail packet is analyzed and classified according to header information (step 200).

Here, Request For Comments (RFC) 822, which is a standard recommendation, generally defines a format for an e-mail. According to RFC 822, an e-mail is divided into a header and a body, and the header contains the address, the origin, etc. of the e-mail.

In addition, decoding is an operation of transforming an encoded e-mail into a readable format. In general, when an originator sends an e-mail, the e-mail is transformed by a message transfer agent (MTA) according to a standard of 8 bit, quoted-printable, base64, etc., and then is transferred. Here, the transformation operation is referred to as encoding. And, a recipient transforms the encoded e-mail back into the original to read it, which is referred to as decoding.

Meanwhile, header information used in an exemplary embodiment of the present invention may comprise information of a mail header H, an originator section Fr, a recipient section To, and an executable attachment file EF. However, the present invention is not limited by the header information and may include a variety of information commonly included in the header of an e-mail.

Subsequently, it is determined whether each piece of header information classified in step 200 is normal or abnormal, i.e., whether each piece of header information is normal is determined according to the spec of the e-mail packet, (step 300), and then a specific value is given to the corresponding header information according to the determination result (step 400).

Here, when header information is normal, a specific value of 1 may be given to the header information, and when header information is abnormal, a specific value of 0 may be given to the header information.

Subsequently, using the specific values given to the respective pieces of header information in step 400, an abnormal e-mail is distinguished according to a logical inference rule to be described below (step 500). Then, when there is an executable attachment file among the header information of an e-mail distinguished as abnormal, it is determined whether the executable attachment file is infected with a virus using distribution of similarity among data to be described below (step 600).

Meanwhile, in an exemplary embodiment of the present invention, it is determined whether an e-mail distinguished as abnormal is infected with a virus only when an executable file is attached to the e-mail. However, the present invention is not limited to this case. For example, it may be determined whether all e-mails to which an executable file is attached are infected with a virus or not.

Finally, it is determined whether the e-mail packet subjected to steps 500 and 600 will be passed according to the policy of an application site or passed through a filtering operation and moved to another site, etc., thereby processing the e-mail packet.

Figure 2:
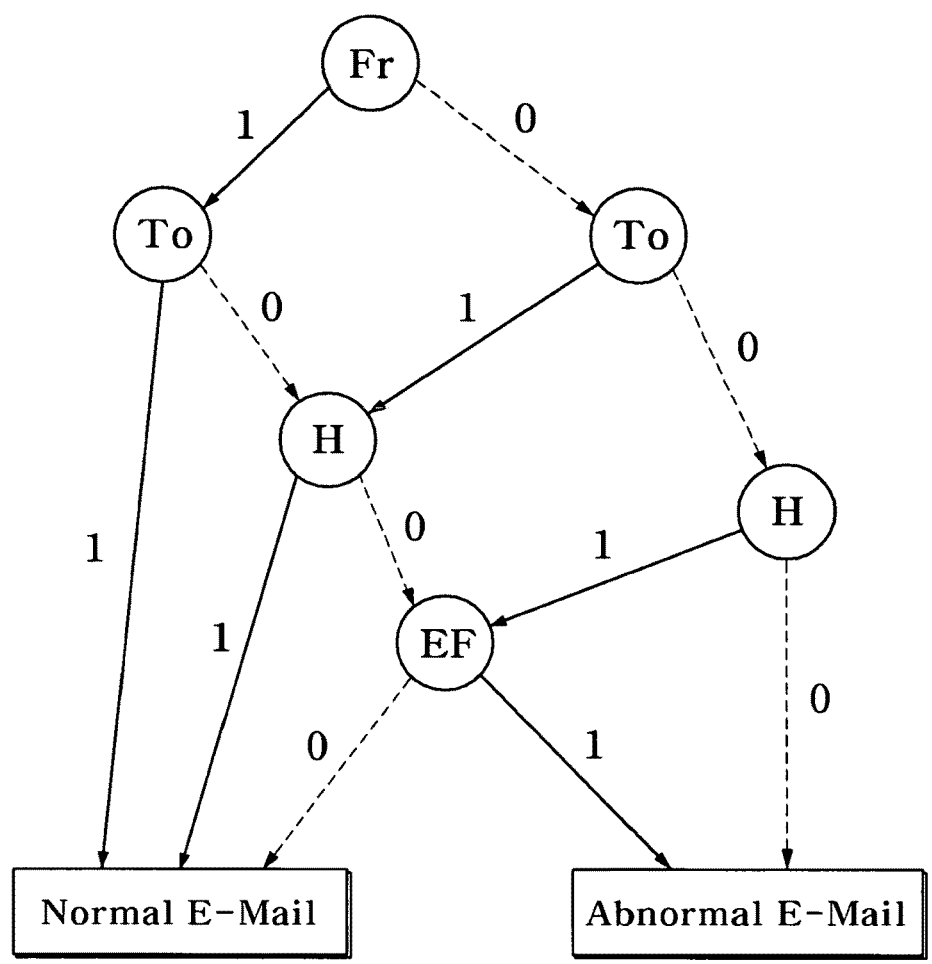
FIG. 2 is a conceptual diagram illustrating a logical inference rule applied to an exemplary embodiment of the present invention.

FIG. 2 is a conceptual diagram illustrating a logical inference rule applied to an exemplary embodiment of the present invention.

Referring to FIG. 2, a logical inference rule applied to an exemplary embodiment of the present invention is obtained by logical inference for classifying an e-mail as normal or abnormal according to respective pieces of header information to which specific values, i.e., 0 and 1, are given.

More specifically, when information on an e-mail's sender, i.e., information of the originator section Fr, is correct (Fr:1), and information on the e-mail's recipient, i.e., information of the recipient section To, is correct (To:1), it is highly probable that the e-mail is normal, and thus the e-mail is classified as normal.

In addition, when information of the originator section Fr is correct (Fr:1), information of the recipient section To is incorrect (To:0), and information of a mail header H conforms to the spec (H:1), it is highly probable that the e-mail is normal, and thus the e-mail is classified as normal.

In addition, when information of the originator section Fr is incorrect (Fr:0), information of the recipient section To is correct (To:1), and information of a mail header H conforms to the spec (H:1), it is highly probable that the e-mail is normal, and thus the e-mail is classified as normal.

In addition, when information of the originator section Fr is incorrect (Fr:0), information of the recipient section To is correct (To:1), the information of the mail header H does not conform to the spec (H:0), and there is no executable attachment file EF (EF:0), it is highly probable that the e-mail is normal, and thus the e-mail is classified as normal.

In addition, when information of the originator section Fr is incorrect (Fr:0), information of the recipient section To is incorrect (To:0), the information of the mail header H conforms to the spec (H:1), and there is no executable attachment file EF (EF:0), it is highly probable that the e-mail is normal, and thus the e-mail is classified as normal.

Meanwhile, when information of the originator section Fr is correct (Fr:1), information of the recipient section To is incorrect (To:0), the information of the mail header H does not conform to the spec (H:0), and there is an executable attachment file EF (EF:1), it is highly probable that the e-mail is abnormal, and thus the e-mail is classified as abnormal.

In addition, when information of the originator section Fr is incorrect (Fr:0), information of the recipient section To is correct (To:1), the information of the mail header H does not conform to the spec (H:0), and there is an executable attachment file EF (EF:1), it is highly probable that the e-mail is abnormal, and thus the e-mail is classified as abnormal.

In addition, when information of the originator section Fr is incorrect (Fr:0), information of the recipient section To is incorrect (To:0), the information of the mail header H conforms to the spec (H:1), and there is an executable attachment file EF (EF:1), it is highly probable that the e-mail is abnormal, and thus the e-mail is classified as abnormal.

In addition, when information of the originator section Fr is incorrect (Fr:0), information of the recipient section To is incorrect (To:0), and the information of the mail header H does not conform to the spec (H:0), it is highly probable that the e-mail is abnormal, and thus the e-mail is classified as abnormal.

Meanwhile, for the determination of whether the mail header H is normal or abnormal, it may be determined, for example, whether there is a multiple content-type (abnormal or normal), whether the mail header H is a multiple encoding header (abnormal or normal), or whether the mail header H is a multiple non-plain header (abnormal or normal), whether a mail header type accords with a body type (abnormal or normal), whether the mail header H is malformed (abnormal or normal), etc.

In addition, for the determination of whether the originator section Fr is normal or abnormal, it may be determined, for example, whether a domain name of an originator Internet protocol (IP) address exists (normal or abnormal), whether a domain of the originator IP address exists (normal or abnormal), whether a domain name of an originator address set by the originator for simple mail transfer protocol (SMTP) uses a domain name, i.e., whether the originator uses an IP address like inseon.yoo@192.168.1.2 (abnormal) or a domain name like inseon.yoo@samsung.com (normal), whether the domain names used for the originator IP address and the originator address accord with each other (normal or abnormal), etc.

In addition, for the determination of whether the recipient section To is normal or abnormal, it may be determined, for example, whether a recipient exists or not (normal or abnormal), whether a recipient address is incorrect, i.e., whether the e-mail has been sent to a set IP address but a totally different address is input as a recipient address in the mail portion (abnormal), whether an IP address other than a domain name is input as the recipient address (abnormal), whether the recipient section To is empty and the e-mail has been sent with reference to a carbon copy (Cc) section or a blind carbon copy (Bcc) section without a domain name (abnormal), whether the recipient section To and the Cc section are empty, a recipient address is input in the Bcc section only, and the e-mail has been sent without a domain name (abnormal), etc.

Figure 3:
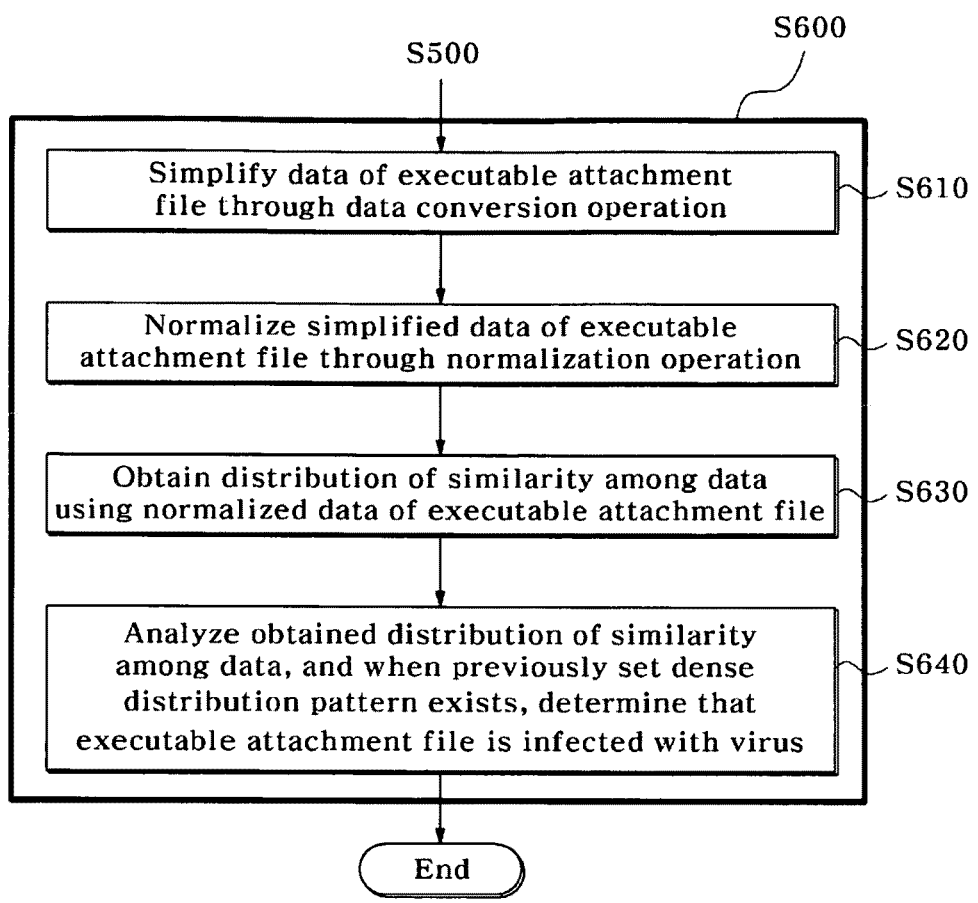
FIG. 3 is a flowchart illustrating in detail a method of determining whether an e-mail is infected with a virus according to an exemplary embodiment of the present invention.

FIG. 3 is a flowchart illustrating in detail a method of determining whether an e-mail is infected with a virus according to an exemplary embodiment of the present invention.

Referring to FIG. 3, when an executable file is attached to an e-mail classified as normal or abnormal, the method of determining whether an e-mail is infected with a virus, which is applied to an exemplary embodiment of the present invention, determines whether the executable file attached to the e-mail is infected with a virus using distribution of similarity among data, to be described below.

More specifically, first, data of the executable attachment file is simplified through a data conversion operation (step 610). Here, the data conversion operation is a process of converting the data of the executable attachment file having a binary format into short integer format.

Subsequently, the data of the executable attachment file simplified in step 610 is normalized through a normalization operation (step 620). The normalization operation is a process of normalizing the simplified data of the executable attachment file by converting it into data within a specific range, e.g., from 0 to 1, etc.

Subsequently, using the data of the executable attachment file normalized in step 620, distribution of similarity among data to be described below is obtained (step 630). Then, the obtained distribution of similarity among data is analyzed, and when a previously set dense distribution pattern exists, it is determined that the executable file attached to the e-mail is infected with a virus (step 640).

Here, the dense distribution pattern indicates a pattern in which data is densely concentrated on a specific point. Such a dense distribution pattern can be seen in virus-infected data. Therefore, it is possible to easily determine whether an executable attachment file is infected with a virus according to whether such a dense distribution pattern exists or not.

Figure 4:
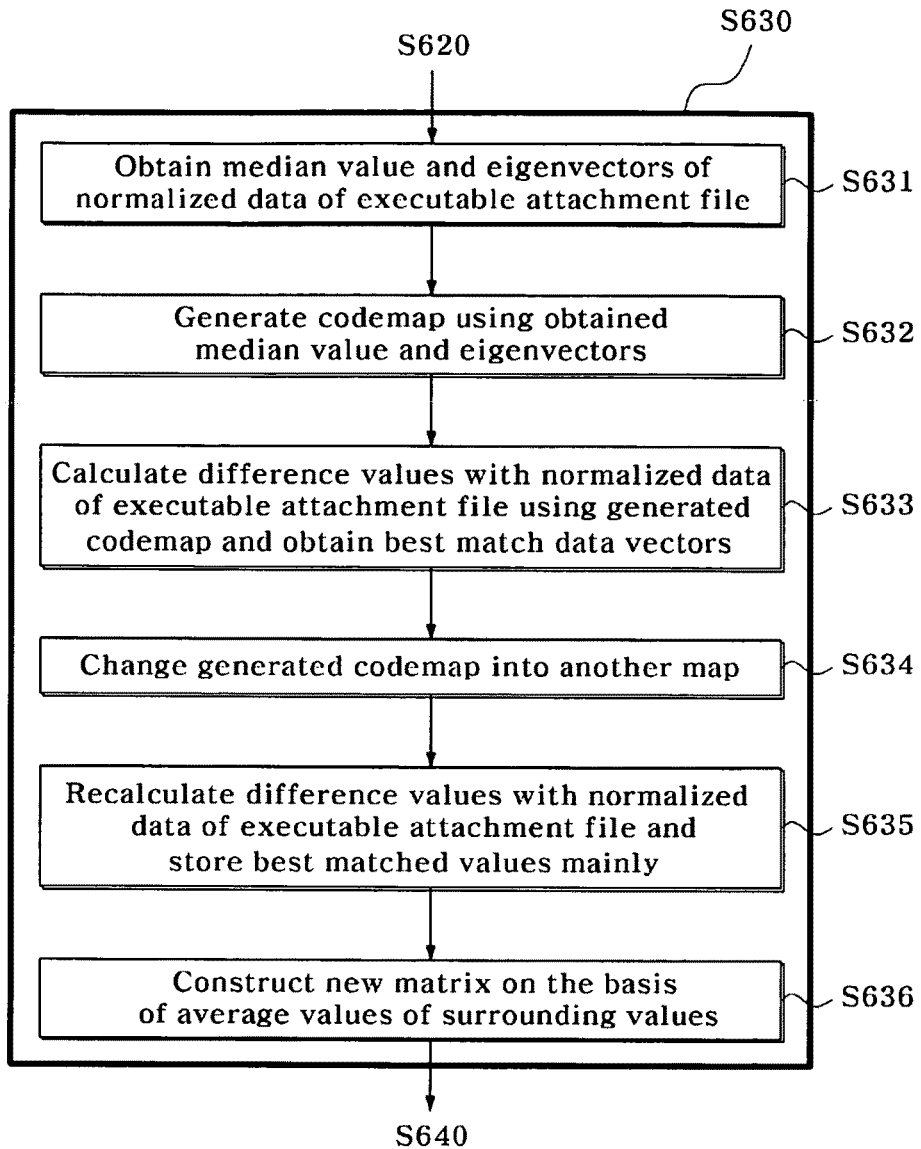
FIG. 4 is a flowchart illustrating in detail a process of obtaining distribution of similarity among data applied to an exemplary embodiment of the present invention.

FIG. 4 is a flowchart illustrating in detail a process of obtaining distribution of similarity among data applied to an exemplary embodiment of the present invention.

Referring to FIG. 4, distribution of similarity among data applied to an exemplary embodiment of the present invention may be obtained through a multi-step data calculation process. To be specific, using a common self-organizing map (SOM) learning algorithm, a codemap optimized for density of the data of the executable attachment file normalized in step 620 of FIG. 3 is generated, and then a new matrix is constructed on the basis of average values of surrounding values, thereby obtaining the distribution of similarity among data.

More specifically, first, a median value and eigenvectors of the normalized data of the executable attachment file are obtained (step 631), and then a codemap is generated using the obtained median value and eigenvectors (step 632).

Subsequently, using the codemap generated in step 632, difference values with the normalized data of the executable attachment file are calculated, thereby obtaining vectors that best match the normalized data, i.e., best match data (step 633).

Subsequently, by the best match data vectors obtained in step 633, the codemap is changed into another map to recalculate all of the data (step 634). Then, difference values with the normalized data of the executable attachment file are recalculated, and values corresponding to a small difference value, i.e., best-matched values, are mainly stored (step 635).

Subsequently, all of the data is reorganized on the basis of average values of surrounding values, thereby constructing a new matrix (step 636).

Meanwhile, steps 631 to 635 employ a common SOM learning algorithm, which is described in detail in "Self-Organization and Associative Memory" by Teuvo Kohonen, 3rd edition, New York: Springer-Verlag, 1998, and "Self-Organizing Maps" by Teuvo Kohonen, Springer, Berlin, Heidelberg, 1995, both well-known documents.

Figures 7, 8:
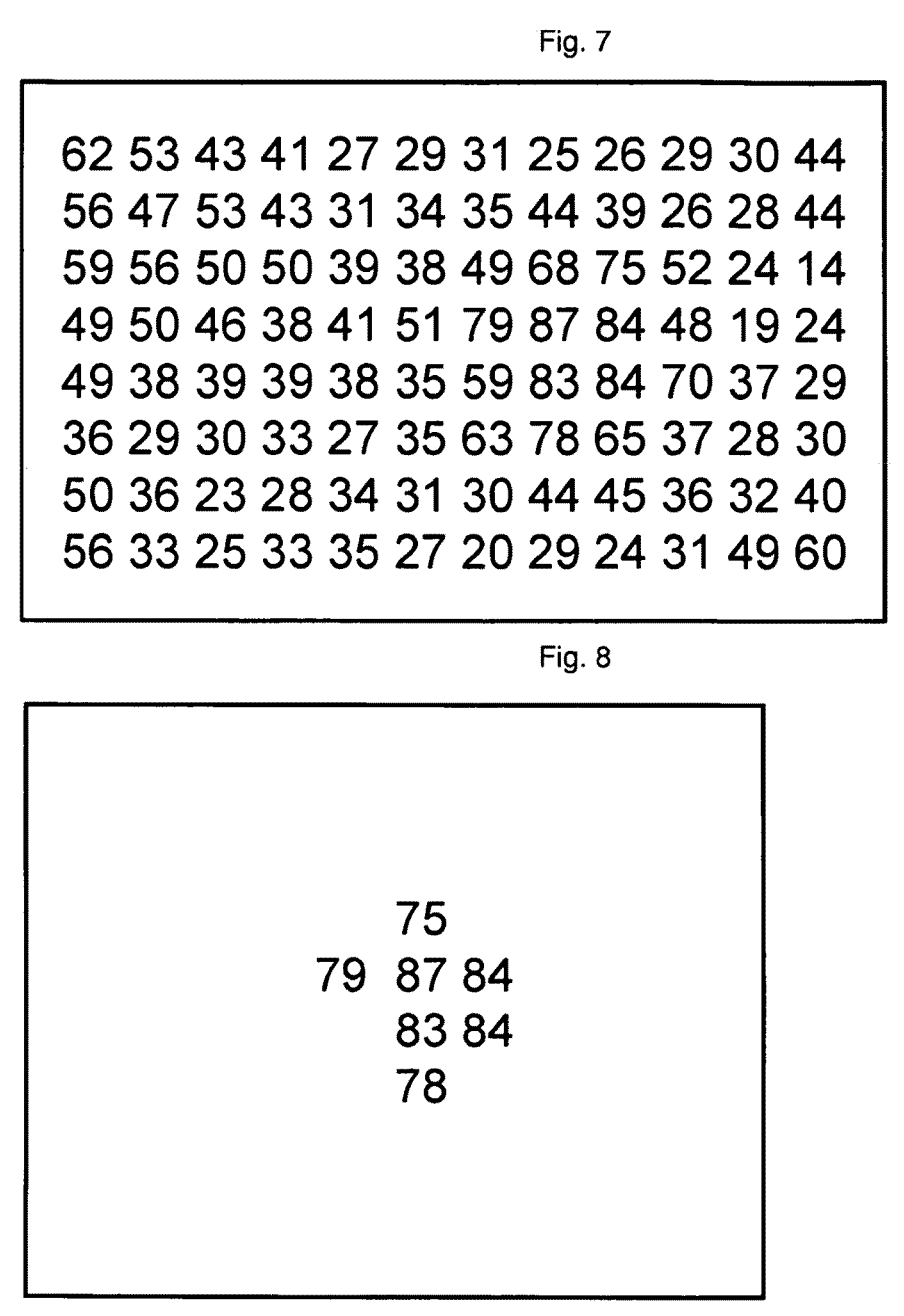
Figure 9:
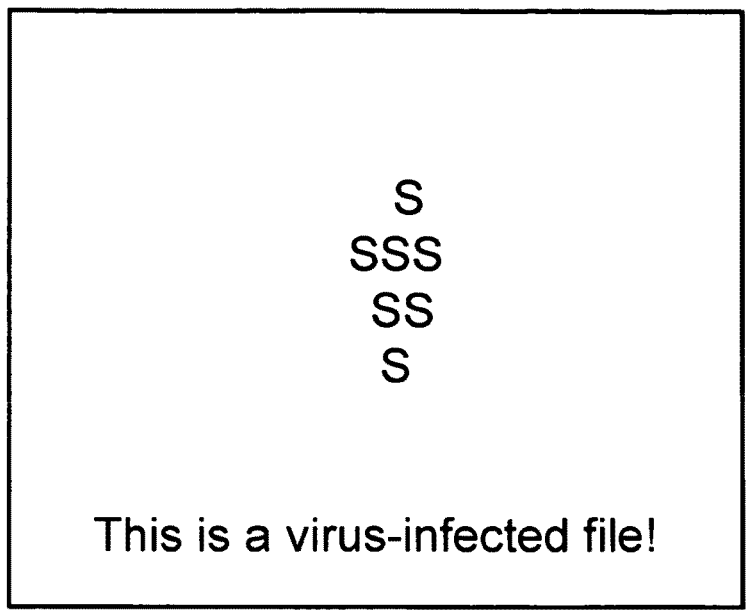

FIGS. 5 to 9 are diagrams showing actual data of files determined to be infected with a virus by a method of determining whether an e-mail is infected with a virus according to an exemplary embodiment of the present invention. FIG. 5 illustrates a part of data of an executable attachment file having the short integer format converted from the binary format. FIG. 6 illustrates a part of data obtained by normalizing the simplified data of an executable attachment file shown in FIG. 5. FIG. 7 illustrates a part of data obtained by applying a SOM algorithm to the data of FIG. 6 and constructing a new matrix. FIG. 8 illustrates data whose similarity distribution is obtained by leaving larger values than a previously set reference value, e.g., 72, among data values obtained in FIG. 7 and removing the others. FIG. 9 illustrates data of FIG. 8 with some values replaced by the letter "S" for easy recognition.

FIG. 10 is a diagram showing actual data having a dense distribution pattern applied to an exemplary embodiment of the present invention, Sub-figures (a) and (b) of FIG. 10 correspond to FIGS. 8 and 9, respectively. When three quarters of a square is filled with the letter "S" in sub-figure (b) of FIG. 10, it may be determined as a dense distribution pattern.

Meanwhile, the letter "S" may fill up a new matrix, which can be seen when all similarities between data are similar to each other. In this case, although the letter "S" is concentrated on one point, it is not determined as a dense distribution pattern.

As described above, the present invention allows an e-mail server to check whether an e-mail is infected with a virus as well as whether an e-mail packet is normal, and to prepare for abnormal e-mail and virus-infected e-mail.

In particular, the present invention does not only block files infected with a virus spread via spam or e-mail but also handles abnormal e-mail packets without a database of specific information. Also, the protection function, requiring one more step, can enhance the security of an e-mail server.

Meanwhile, the method of distinguishing an abnormal e-mail and determining whether an abnormal e-mail is infected with a virus according to the present invention can be stored on a computer-readable recording medium in the form of computer code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a nonvolatile memory (flash memory), an optical data storage device, and so on. Also, the recording medium may be carrier waves, e.g., transmission over the Internet.

In addition, the computer-readable recording medium may be distributed among computer systems connected via a communication network and stored in the form of a code that can be read and executed by a de-centralized method.

While the invention has been shown and described with reference to certain exemplary embodiments of a method of distinguishing an abnormal e-mail and determining whether an abnormal e-mail is infected with a virus or not, it will be understood by those skilled in the art that various changes in form and details may be made therein without departing from the spirit and scope of the invention as defined by the appended claims.

The invention claimed is:

1. A method of distinguishing an abnormal e-mail, comprising the steps of:
   decoding, through the use of a computer processor, received e-mail data;
   analyzing the decoded e-mail data and classifying a header of the analyzed e-email data according to header fields of the header in the email data;
   determining whether each of the header fields is normal or abnormal;
   assigning one of a first value indicating a normal header field and a second value indicating an abnormal header field to the each of the header fields, according to the determination results;
   applying a logical inference rule to the header fields given the one of the first value and the second value, the logical inference rule being a set of conditional operations that determine the e-mail data as normal or abnormal based on the first value or the second value given to the each of the header fields; and
   determining that the e-mail data is normal or abnormal based on a result of the applying.

2. The method of claim 1, wherein the header fields comprise a mail header H, an originator section Fr, a recipient section To, and information indicating presence or absence of an executable attachment file EF.

3. The method of claim 1, wherein when the each of the header fields is normal, the first value of 1 is given to the header field, and when a header field is abnormal, the second value of 0 is given to the header field.

4. The method of claim 1, wherein the header fields comprise a mail header H, an originator section Fr, a recipient section To, and information indicating presence or absence of an executable attachment file EF, and when the originator section Fr is given the first value, the recipient section To and the mail header H are given the second value, and the executable attachment file EF exists, the logical inference rule determines the e-mail data as abnormal.

5. The-method of claim 1, wherein the header fields comprise a mail header H, an originator section Fr, a recipient section To, and information indicating presence or absence of an executable attachment file EF, and when the originator section Fr is given the second value, the recipient section To is given the first value, the mail header H is given the second value, and the executable attachment file EF exists, the logical inference rule determines the e-mail data as abnormal.

6. The method of claim 1, wherein the header fields comprise a mail header H, an originator section Fr, a recipient section To, and information indicating presence or absence of an executable attachment file EF, and when the originator section Fr and the recipient section To are given the second value, the mail header H is given the first value, and the executable attachment file EF exists, the logical inference rule determines the e-mail data as abnormal.

7. The method of claim 1, wherein the header fields comprise a mail header H, an originator section Fr, a recipient section To, and information indicating presence or absence of an executable attachment file EF, and when the originator section Fr, the recipient section To, and the mail header H are given the second value, the logical inference rule determines the e-mail data as abnormal.

8. A method of determining whether an e-mail is infected with a virus, comprising the steps of:
   decoding, through the use of a computer processor, received e-mail data;
   analyzing the decoded e-mail data and classifying a header of the analyzed e-mail data according to header fields of the header in the email data;
   determining whether each of the header fields is normal or abnormal;
   assigning one of a first value indicating a normal header field and a second value indicating an abnormal header field to the each of the header fields, according to the determination results;
   applying a logical inference rule to the header fields given the one of the first value and the second value, the logical inference rule being a set of conditional operations that determine the e-mail data as normal or abnormal based on the first value or the second value given to the each of the header fields;
   determining that the e-mail data is normal or abnormal based on a result of the applying; and
   when there is an executable attachment file indicated in the header fields of an e-mail distinguished as abnormal, determining whether the abnormal e-mail is infected with a virus using a distribution of similarity among data of the executable attachment file.

9. The method of claim 8, wherein the step of determining whether the abnormal e-mail is infected with a virus comprises the steps of:
   converting and simplifying the data of the executable attachment file;
   normalizing the simplified data of the executable attachment file;
   obtaining the distribution of similarity among the data using the normalized data of the executable attachment file;
   analyzing the obtained distribution of similarity among the data; and
   when a previously set dense distribution pattern exists, determining that the executable attachment file is infected with a virus.

10. The method of claim 9, wherein the distribution of similarity among the data is obtained by generating an optimized code map of the normalized data of the executable attachment file and constructing a new matrix on the basis of average values of surrounding values.

11. The method of claim 8, wherein the header fields comprise a mail header H, an originator section Fr, a recipient section To, and information indicating presence or absence of an executable attachment file EF.

12. The method of claim 8, wherein when the each of the header fields is normal, the first value of 1 is given to the header field, and when a header field is abnormal, the second value of 0 is given to the header field.

13. The method of claim 8, wherein the header fields comprise a mail header H, an originator section Fr, a recipient section To, and information indicating presence or absence of an executable attachment file EF, and when the originator section Fr is given the first value, the recipient section To and the mail header H are given the second value, and the executable attachment file EF exists, the logical inference rule determines the e-mail data as abnormal.

14. The method of claim 8, wherein the header fields comprise a mail header H, an originator section Fr, a recipient section To, and information indicating presence or absence of an executable attachment file EF, and when the originator section Fr is given the second value, the recipient section To is given the first value, the mail header H is given the second value, and the executable attachment file EF exists, the logical inference rule determines the e-mail data as abnormal.

15. The method of claim 8, wherein the header fields comprise a mail header H, an originator section Fr, a recipient section To, and information indicating presence or absence of an executable attachment file EF, and when the originator section Fr and the recipient section To are given the second value, the mail header H is given the first value, and the executable attachment file EF exists, the logical inference rule determines the e-mail data as abnormal.

16. The method of claim 8, wherein the header fields comprise a mail header H, an originator section Fr, a recipient section To, and information indicating presence or absence of an executable attachment file EF, and when the originator section Fr, the recipient section To, and the mail header H are given the second value, the logical inference rule determines the e-mail data as abnormal.

17. A method of determining whether an e-mail is infected with a virus, comprising the steps of:
   when an executable file is attached to a received e-mail, programming a computer for converting and simplifying data of the executable attachment file;
   normalizing the simplified data of the executable attachment file through the use of the computer;
   obtaining a distribution of similarity among the data of the executable attachment file using the normalized data of the executable attachment file; and
   analyzing the obtained distribution of similarity among data using the computer program, such that when a previously set dense distribution pattern exists, determining that the executable attachment file is infected with a virus.

18. The method of claim 17, wherein the distribution of similarity among data is obtained by generating an optimized codemap of the normalized data of the executable attachment file and then constructing a new matrix on the basis of average values of surrounding values.

19. A non-transitory computer-readable recording medium storing a program capable of executing a method of distinguishing an abnormal e-mail, comprising the steps of:
   decoding, through the use of a computer processor, received e-mail data;
   analyzing the decoded e-mail data and classifying a header of the analyzed e-email data according to header fields of the header in the email data;
   determining whether each of the header fields is normal or abnormal;
   assigning one of a first value indicating a normal header field and a second value indicating an abnormal header field to the each of the header fields, according to the determination results;

applying a logical inference rule to the header fields given the one of the first value and the second value, the logical inference rule being a set of conditional operations that determine the e-mail data as normal or abnormal based on the first value or the second value given to the each of the header fields; and determining that the e-mail data is normal or abnormal based on a result of the applying.

20. The method of claim 1, wherein the set of conditional operations is a binary decision diagram having the pieces of header information as nodes and leaves that indicate whether the e-mail data is normal or abnormal reachable by traversing the binary decision diagram along edges between the nodes.

* * * * *